United States Patent [19]

Grillon et al.

[11] Patent Number: 4,931,874
[45] Date of Patent: Jun. 5, 1990

[54] DIGITAL SYSTEM FOR GENERATING LASER-MODULATION MULTI-CHANNEL CIRCUIT CONTROL SIGNALS FOR AN OSCILLATING MIRROR PROJECTOR OF SCANNED IMAGES

[75] Inventors: Jean Grillon, Eragny sur Oise; Christian Moreau, Montigny le Bretonneux, both of France

[73] Assignee: Thomson-CSF, Paris, France

[21] Appl. No.: 169,953

[22] Filed: Mar. 18, 1988

[30] Foreign Application Priority Data

Mar. 20, 1987 [FR] France ................................ 87 03918

[51] Int. Cl.⁵ ............................................. H04N 5/74
[52] U.S. Cl. ...................................... 358/231; 358/104
[58] Field of Search ................. 358/231, 232, 237, 93, 358/104, 103, 60

[56] References Cited

U.S. PATENT DOCUMENTS 4,654,713 3/1987 Zimmerman ......................... 358/231
4,769,712 9/1988 Polaert ................................ 358/60
4,799,103 1/1989 Muckerheide ....................... 358/231

FOREIGN PATENT DOCUMENTS 2367299 5/1978 France .

OTHER PUBLICATIONS

Patent Abstracts of Japan, vol. 9, No. 44 (P-337) (1767), Feb. 23, 1985; & JP-A-59 182 417 (Hitachi Medeiko K.K.), Oct. 17, 1984, *Resume.*

Primary Examiner—Tommy P. Chin
Attorney, Agent, or Firm—Oblon, Spivak, McClelland, Maier & Neustadt

[57] ABSTRACT

To compensate for the non-linearity of the oscillations of the line galvanometer of a scanned image projector with oscillating mirrors, compensation circuits are used. These compensation circuits act on the video signal by modulating the duration of the pixels of the digitized video signal and their position in the period of the line, in a manner that is inversely proportionate to the instantaneous speed of the galvanometer. The system can be applied to fighter aircraft simulators.

5 Claims, 10 Drawing Sheets

DIGITAL SYSTEM FOR GENERATING LASER-MODULATION MULTI-CHANNEL CIRCUIT CONTROL SIGNALS FOR AN OSCILLATING MIRROR PROJECTOR OF SCANNED IMAGES

BACKGROUND OF THE INVENTION

1. Field of the Invention

The present invention relates to a digital system for the generation of control signals for laser modulation multi-channel circuits for oscillating mirror projectors of scanned images.

It relates, among others, to the generation of moving images and to their projection as wide-angle pictures. This technique is used for example, in the simulation of the visual environment of pilots and their training for aerial combat.

This training is done in large-diameter spheres. The internal surface of these spheres forms a wide-angle reflecting screen, and there are reproductions of fighter aircraft cockpits at the center of these spheres.

2. Description of the Prior Art

In the prior art, images of targets are obtained by projection systems placed above and behind the pilot.

These systems consist of "light valve" or other type image generators which have low luminous efficiency and give a halo around the image itself of the target.

This halo is especially detrimental because, although it has low luminosity, the pilot easily distinguishes it first. This enables him to see the target located at its center without actually having to identify it. His training is thus distorted because he is unable, in these conditions, to exercise and demonstrate his attentiveness and qualities of observation which are indispensable for aerial combat.

It has been pointed out, however, that these image generators could be replaced by laser image projection systems which do not have these advantages and which, furthermore, are less costly and less bulky, and can be placed on either side of the cockpit in order to completely clear the pilot's field of visibility.

These projection systems comprise, among others, one or more laser sources, laser modulation circuits controlled by video signals of the image to be projected and two oscillating mirrors mounted, for example, on pencil-shaped galvanometers capable of deflecting the laser beam along two orthogonal axes so as to give a scanned image.

The requirement that the target image should be presented in an angular field of about ten degrees, corresponding substantially to an aircraft at 300 meters, and the need for adequate definition despite the as yet limited efficiency of galvanometers, mean that the projection of laser scanned images encounters two difficulties: these are, firstly, the non-linearity of the line galvanometer oscillations and secondly, a deterioration of the image, due to intermodulation given by the multi-channel laser modulator. The video lines have to be scanned on several lines simultaneously.

For to satisfy the needs of the human eye and those of realistic simulation, the definition of the target image should be at least 256 lines of 256 pixels.

Furthermore, since the target images are logically produced from parent images meeting television standards, their projection should be done at the same rate, in two frames of a maximum duration of 20 ms.

Furthermore, present technology does not provide for any galvanometer other than one having a maximum cut-off frequency in the range of 7000 Hz.

Thus the frame galvanometer, which oscillates at a fundamental frequency below 100 Hz, raises no problem, but the line galvanometer has to oscillate at a frequency of $256/40.10^{-3}$, namely 6400 Hz (256 pixels per line and, $2 \times 20$ ms which is very high).

It will be incapable of tracking the saw-toothed control signal harmonics.

The frequency of this signal should therefore be reduced. This is acceptable only if several video lines are projected simultaneously at each oscillation.

SUMMARY OF THE INVENTION

The object of the system according to the invention, in a laser projection system for scanned images, using oscillating galvanometers, is therefore to compensate for the non-linearity of the line galvanometer oscillations and for intermodulation among the channels of the laser modulation circuits.

A characteristic of the system according to the invention is to provide, in a projection of pairs of successive lines, the values V1 and V2 of the laser modulator control voltages determining the effective fluxes F1 and F2 needed to project each pair of pixels with the respective luminances (11 and 12) desired and the projected dimension desired.

Another characteristic of the system according to the invention is that the values V1 and V2, computed beforehand from the response characteristics of the modulator and the rotational speed curve of the line galvanometer, are stored respectively in two read-only memories, known as "control voltage" memories at addresses consisting of all the triple combinations possible formed between the digitized values of the luminances (11, 12) of the pixels and the value of the instant (t) considered during the line scan.

Another characteristic of the system according to the invention is that since the successive values of the luminances in each frame of the image to be projected are placed, line by line, in two buffer memories, comprising two successive lines each, in see-saw mode, the pairs of lines thus formed are read alternately in real time in each buffer memory at a speed that varies discretely such that the duration dt, during which the luminances 11 and 12 of the paired pixels on both lines are available and are given as addresses to the voltage memories, is inversely proportionate to the rotational speed of the line galvanometer at the considered instant t of the line scan.

BRIEF DESCRIPTION OF THE DRAWINGS

Other characteristics of the system according to the invention will appear in the following description of an embodiment illustrated by a set of figures, of which:

BRIEF DESCRIPTION OF THE DRAWINGS

Figure 1:
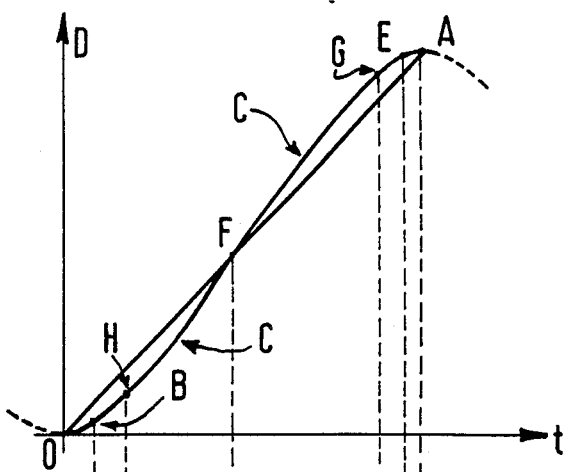
Figure 2:
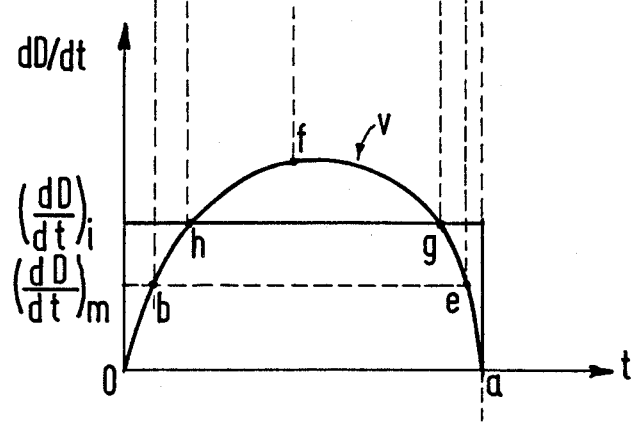
Figure 3:
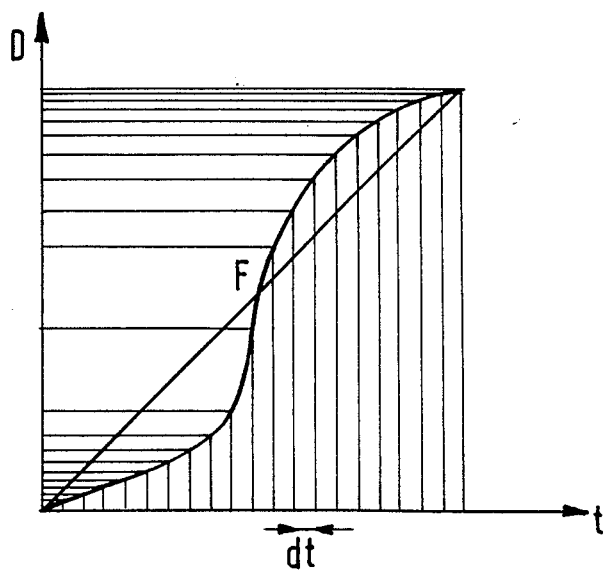
Figure 4:
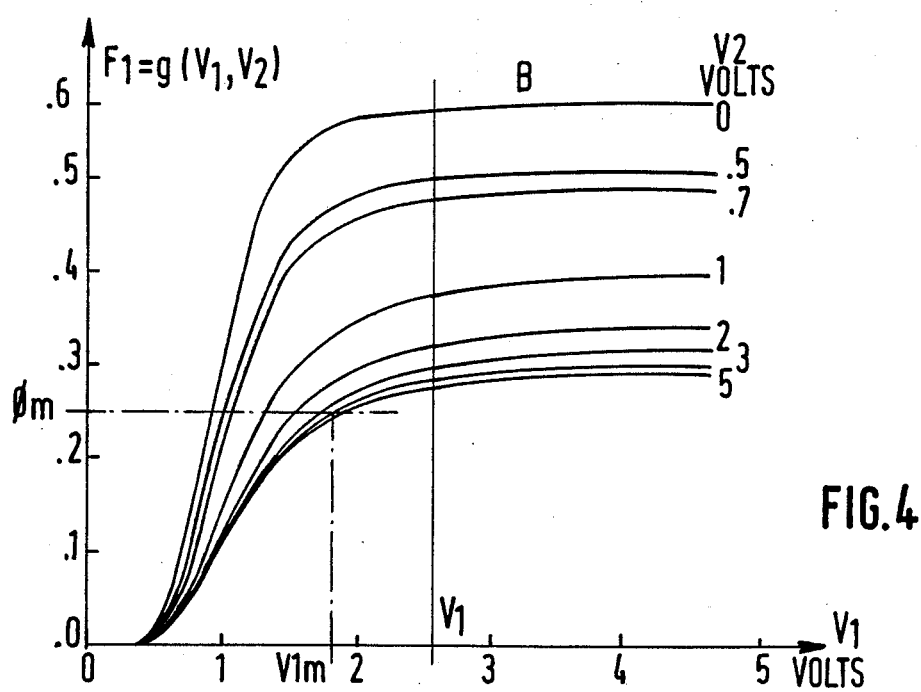
Figure 5:
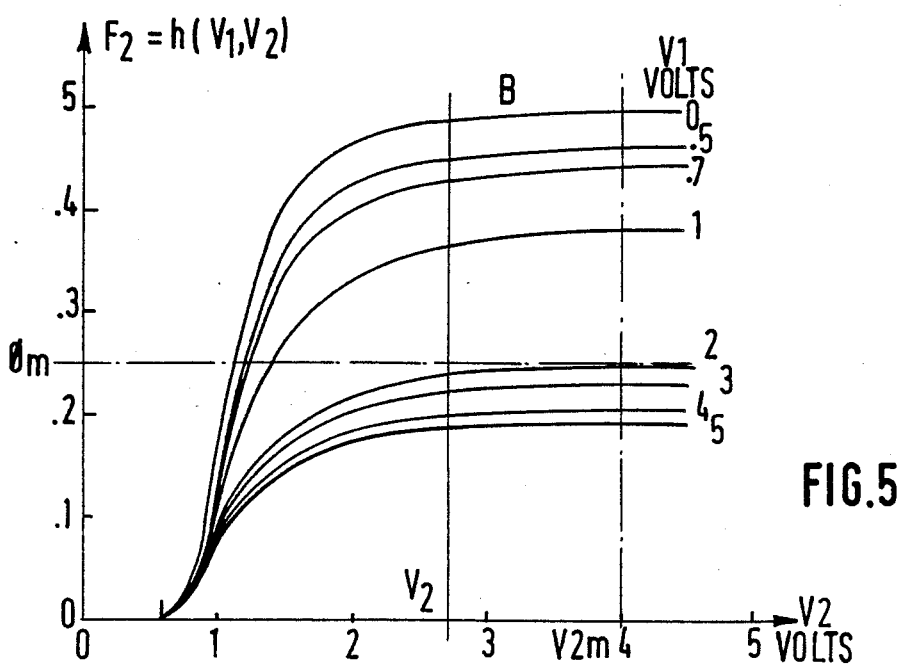
Figure 6:
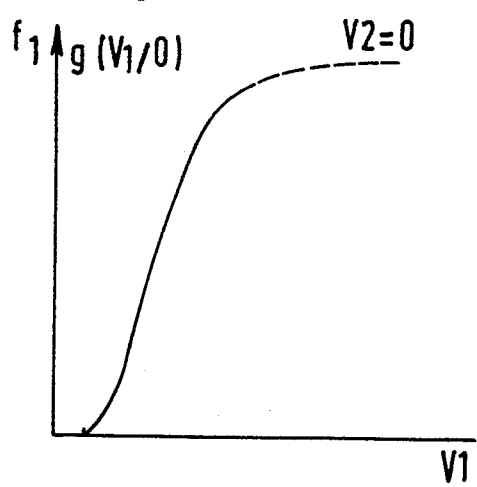
Figure 6:
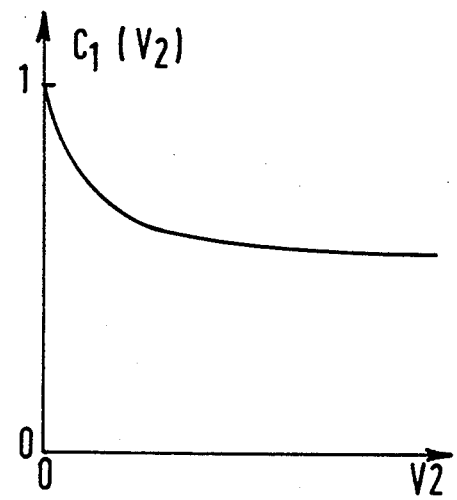
Figure 6:
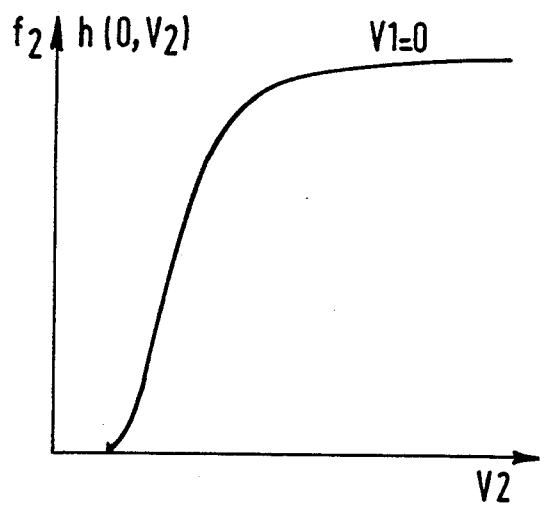
Figure 6:
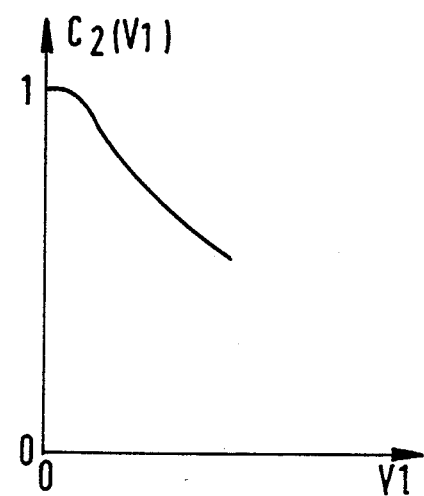
Figure 7:
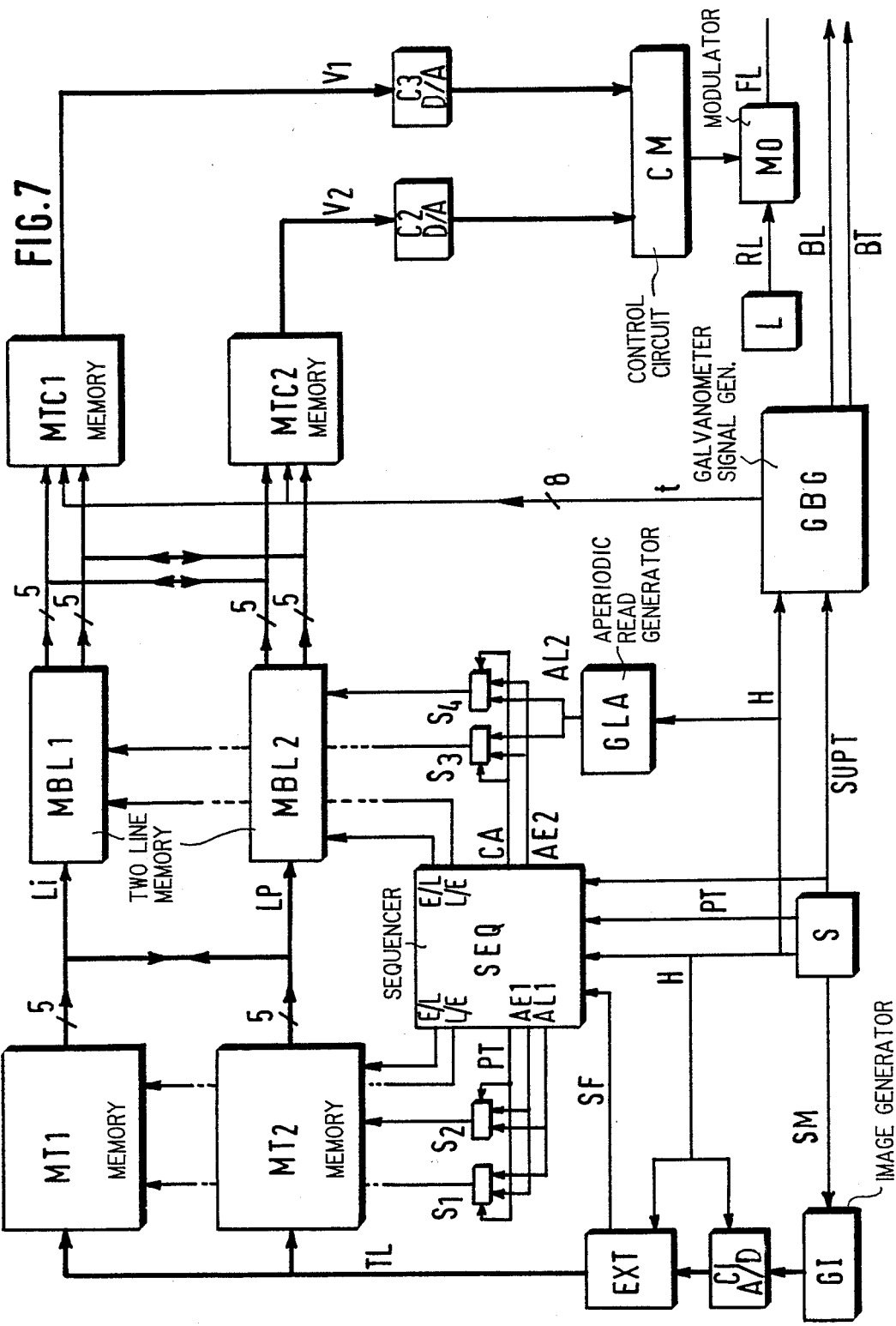
Figure 12A:
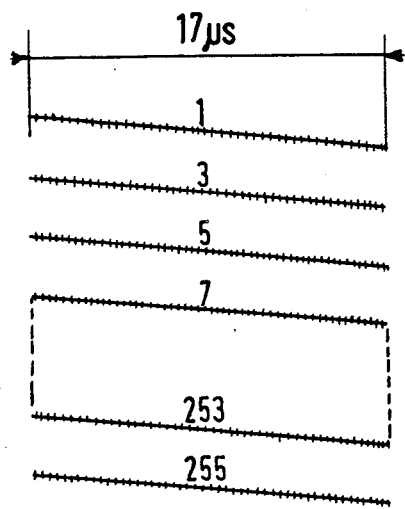
Figure 12B:
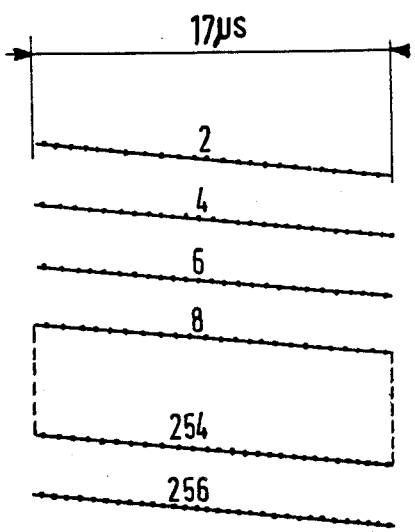
Figure 12C:
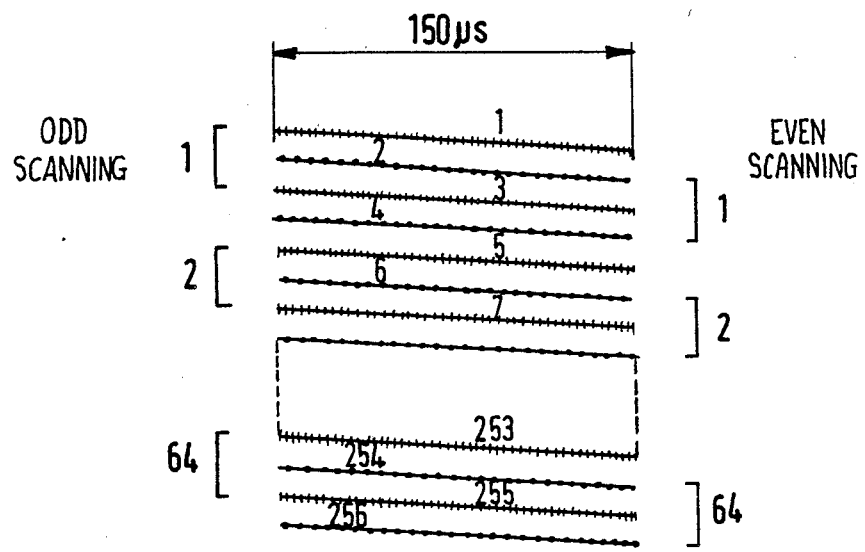
Figure 13:
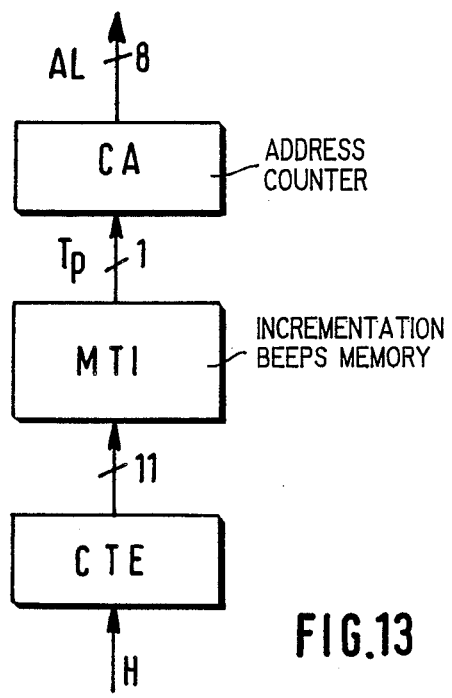
Figure 14:
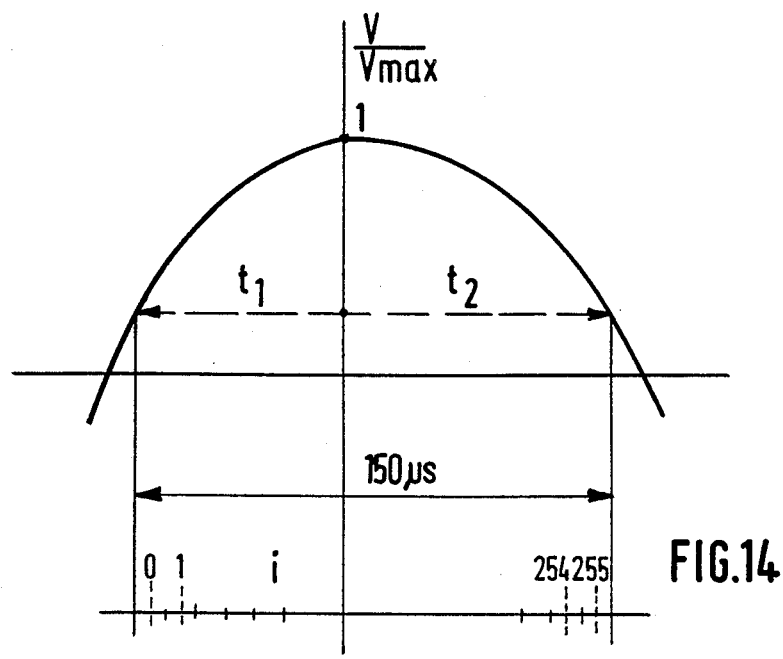
Figure 15:
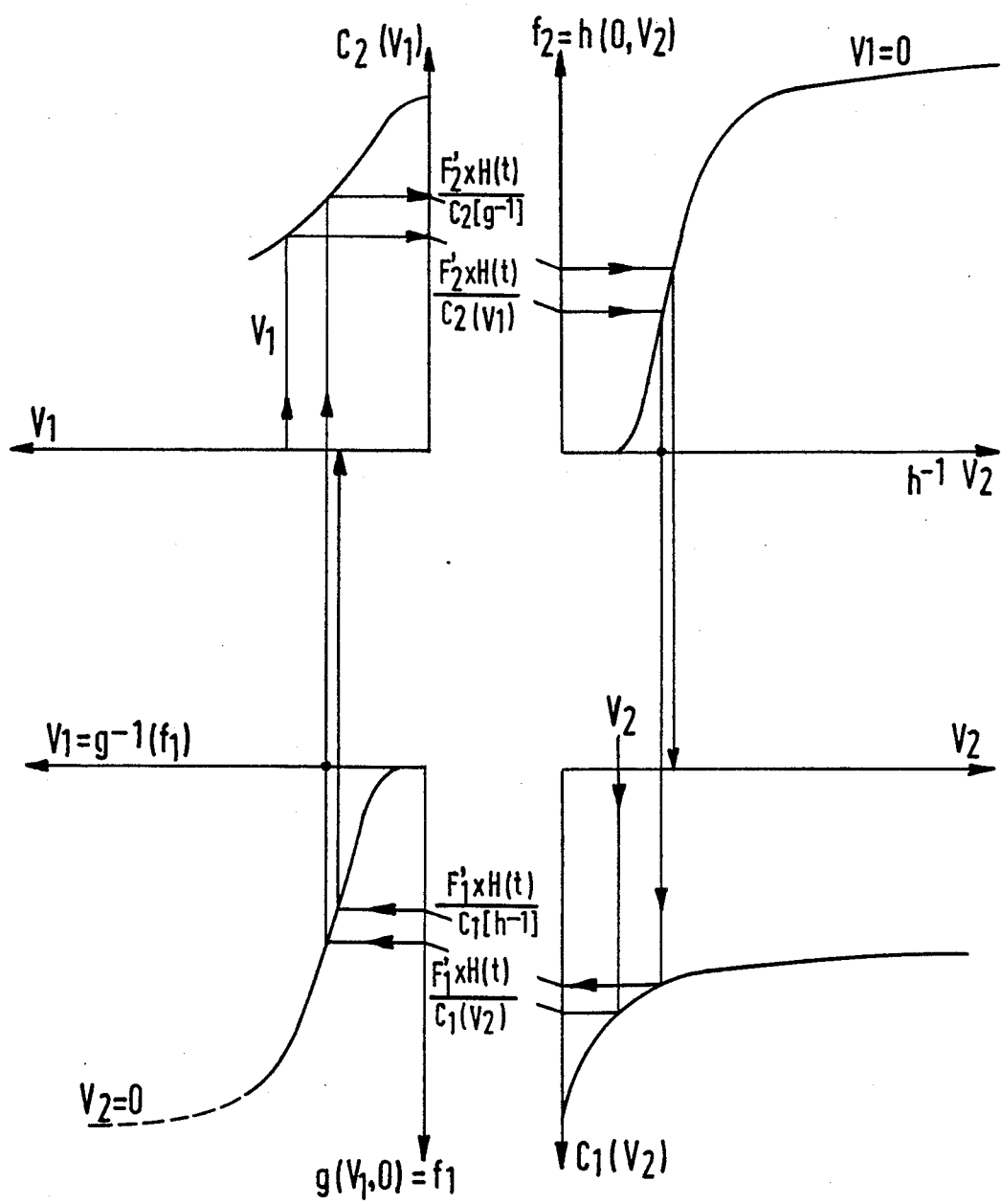

FIGS. 1, 2 and 3 show the non-linearity of the line galvanometer,

FIGS. 4 and 5 show the response characteristics of the laser modulation circuits, FIG. 6 shows the four curves from which the control voltages of the modulation circuits may be computed, FIG. 7 shows a diagram of the system according to the invention, FIGS. 8, 9, 10 and 11 show the timing diagrams of the system according to the invention, FIG. 12 shows the laser image frames at the output of the extractor, as well as the two interposed frames in real time forming the projected laser image, FIG. 13 shows a diagram of the aperiodic read generator, FIG. 14 shows how the useful part of the speed curve is divided into as many as time intervals as there are pixels in the line, FIG. 15 illustrates the computations performed by a computer.

DESCRIPTION OF A PREFERRED EMBODIMENT

The angular deflection D of the line galvanometer as a function of time has the shape given by the curve C (FIG. 1) while the ideal deflection is defined by the straight segment OA. To the curve C corresponds (FIG. 2) the curve v of the deflection speed dD/dt. The maximum speed is reached at the peak f. At the points h and g, the speed is equal to the constant speed (dD/dt)i corresponding to the ideal deflection OA.

At the points H and G which are homologous, on the curve C, with the points h and g, the tangent to this curve is parallel with the segment OA.

The curves, and in particular the speed curve, are not linear. Below a speed (dD/dt)m, to which the points b and e correspond, the speed is inadequate. It is even cancelled at the points o and a, thus making any compensation impossible in the paths ob and ae.

These parts, therefore, cannot be used and the useful range of the line galvanometer, during which the beam is projected, is restricted to between the points B and E (FIG. 1).

The deflection curve (FIG. 3) shows that the non-linearity, which has been exaggerated in this curve, contributes a so-called "geometry" fault. Deflections greater than the mean deflection are excessive, while smaller deflections are insufficient. The result of this is a deformation of the image as well as lesser luminance in the middle of the lines.

The non-linearity of the line galvanometer motion should be compensated for, according to the invention (as shall be described), by a modulation of the duration of the pixels and of their position in the period of the line, at the digitized video image, in a manner that is inversely in proportion to the instantaneous speed of the galvanometer and by an adjustment of the values of the laser fluxes proportionate to this speed.

Furthermore, the response characteristics of the laser modulator used, for example, with two channels (FIGS. 4 and 5) show that the laser fluxes F1 and F2, emitted respectively on these two channels, both depend on the control voltages V1 and V2 applied to these channels and that the result of this is major intermodulation.

The effects of this intermodulation are corrected, according to the invention, as shall be described further below, by a suitable defining of the control voltages V1 and V2 of the modulation circuits.

For their values can be computed from the frequency response characteristics of the modulation circuits.

$F1 = g(V1, V2)$ and $F2 = h(V1, V2)$, (FIGS. 4 and 5).

Each family gives the value of the flux given on a channel according to the voltage applied to this channel and according to the voltage on the other channel. Each curve corresponding to a particular value of this latter voltage is taken as a parameter.

In particular, for each group of characteristic curves and for any control voltage value (V1 or V2), the value of the flux is determined by the ordinate of the intersection between the vertical of the x-axis V1 (or V2) and the curve corresponding to the chosen parameter value for the other channel.

The intermodulation value can be assessed by comparing the values of the fluxes given by the various characteristic curves with the value given by the basic curve B for which V1 or V2=0 and for which there is therefore no intermodulation.

It is observed that the curves are homothetical and that the flux values can be deduced from the flux given by the basic curve, by one and the same relationship or coefficient of intermodulation C.

Thus, the group of curves $F1 = g(V1, V2)$ is reduced to the two simplest curves $g(V1, 0)$ and $C1(V2)$ FIG. 6 and the value of the flux F1 in response to the two control voltages V1 and V2 is given by the relationship:

$$F1 = g(V1, 0) \times C1(V2) \quad (c).$$

In the same way, the group of curves $F2 = h(V1, V2)$ is reduced to the two curves $h(0, V2)$ and $C2(V1)$; the value of the flux F2 being given by the relationship:

$$F2 = h(0, V2) \times C2(V1) \quad (d).$$

This gives us first of all, two intermediate relationships (e) and (f) of V1 and V2, using the reciprocal functions $g^{(-1)} h^{(-1)}$ of g and h:

$$V_1 = g^{(-1)} \left( \frac{F1}{C1(V_2)} \right) \quad (e)$$

$$V_2 = h^{(-1)} \left( \frac{F2}{C2(V_1)} \right) \quad (f)$$

Then, by replacing the two members V1 and V2 by their expressions given by these same relationships, we obtain the relationships (i) and (j):

$$V_1 = g^{(-1)} \left[ \frac{F1}{C_1 \left[ h^{(-1)} \frac{F2}{C_2(V_1)} \right]} \right] \quad (i)$$

$$V_2 = h^{(-1)} \left[ \frac{F2}{C_2 \left[ g^{(-1)} \frac{F1}{C_1(V_2)} \right]} \right] \quad (j)$$

The values of the voltages V1 and V2 to be applied to the modulation circuits to obtain the fluxes F1 and F2 as desired are computed by the devices described below, by means of these formulae. The values of V1 and V2 are those that respectively meet the two members of the last two relationships (i) and (j).

The laser images proceed from parent images given by an image generator GI (FIG. 7) which may be a synthetic image generator, a video tape recorder or any similar device that meets television standards.

These images are formed, for example, by two frames with a standard of 625 lines.

The video signal coming from the generator is digitized in an analog/digital converter C1. In each of the frames, an extractor EXT cuts out a "window" forming a laser image frame with 128 lines of 256 pixels (17 μs approximately) in order to form the desired laser image with 256 lines of 256 pixels defined by their digitized luminances 1.

The odd-numbered and even-numbered frames are transmitted, in the form of laser frame signals T1, to two frame memories MT1 and MT2 every 20 ms.

These two memories function in see-saw mode. While one of them is in write mode at the standard television rate and receives a frame from the extractor, the other is in read mode, in real time, i.e. at the scanning pace of the laser images to be projected.

Figure 8:
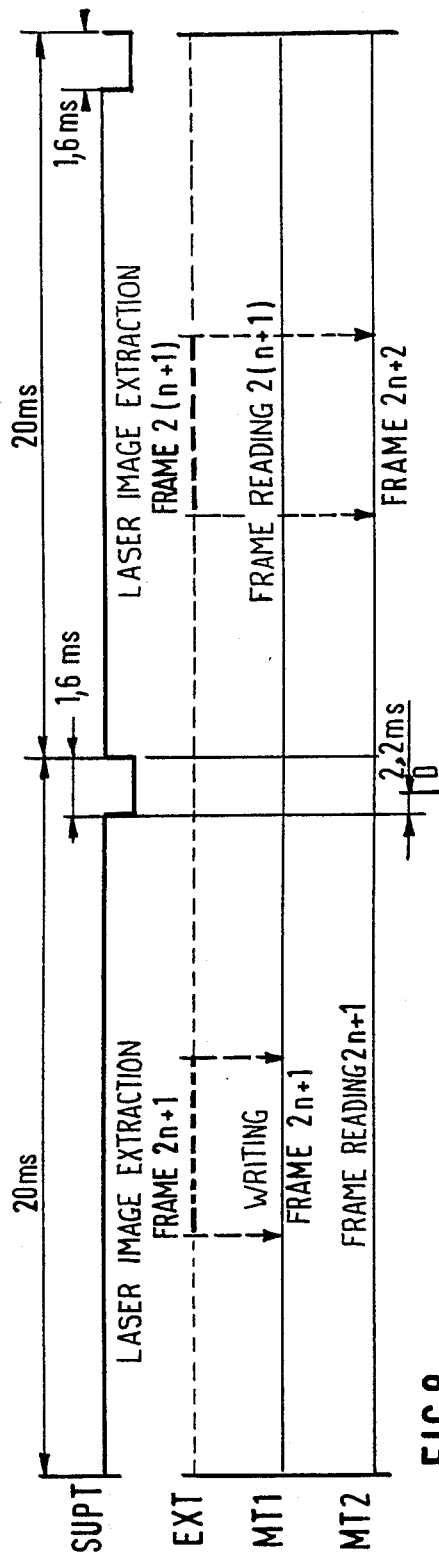

The functioning of these memories and, more particularly, the write periods are defined by the timing diagram of FIG. 8.

During the read operation, the pairs of successive lines are transmitted to two "two-line" memories, MBL1 and MBL2, with a capacity of two lines each.

Figure 10:
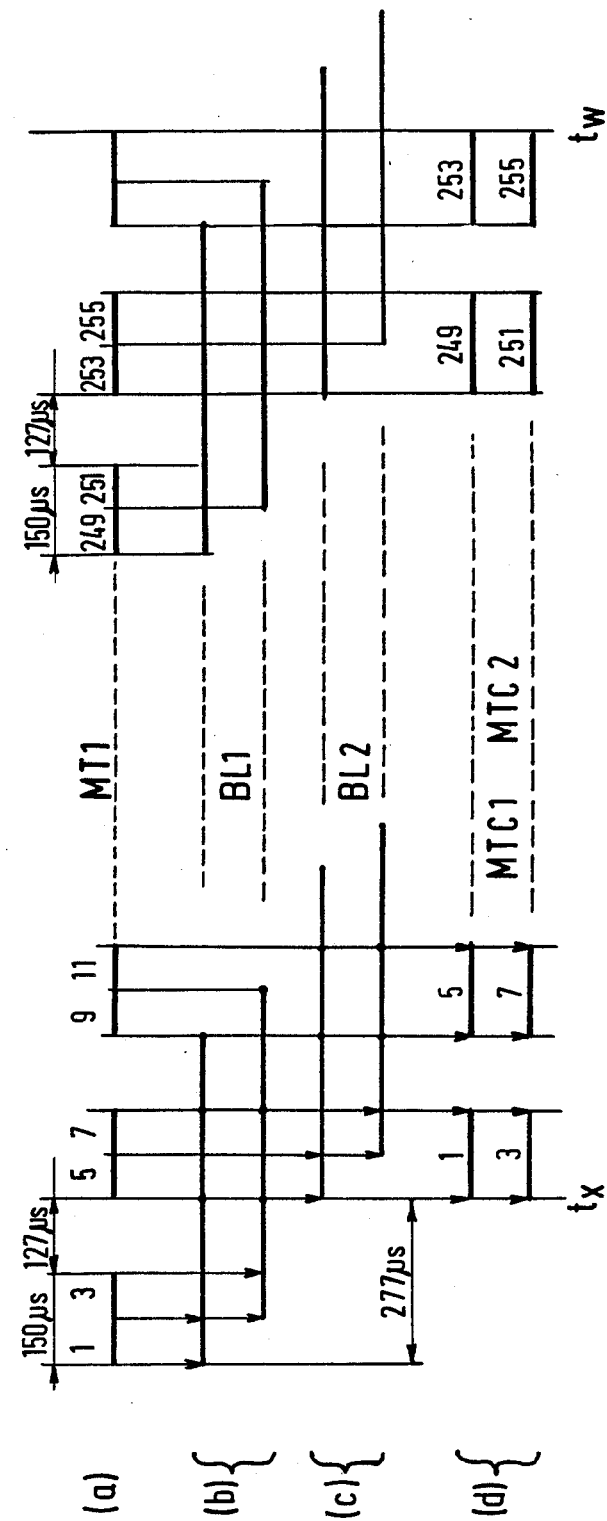
Figure 11:
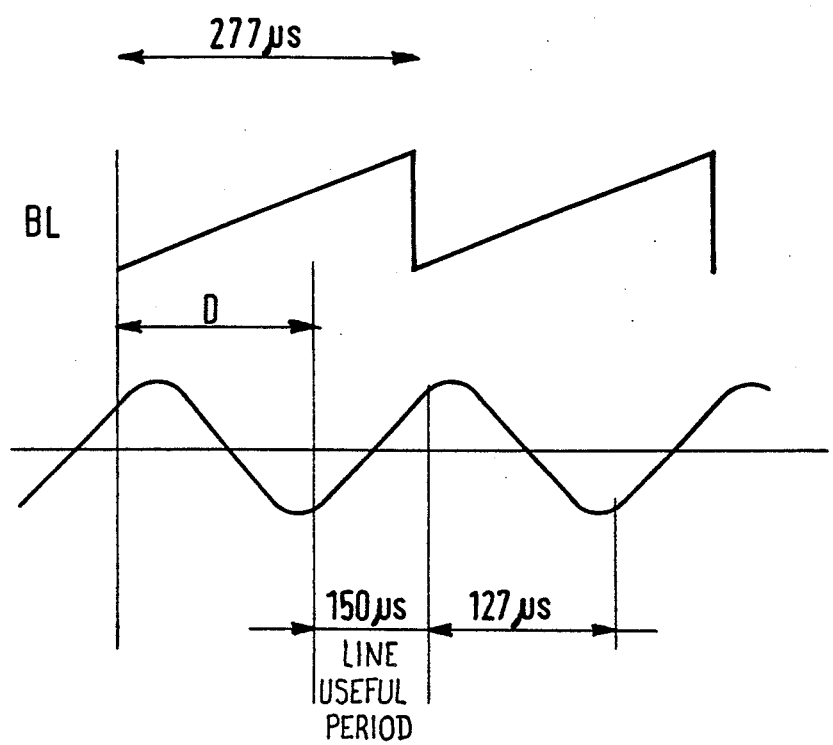

The process of this read operation and the functioning of the memories MBL1 and MBL2 are defined by the timing diagram of FIG. 10.

This chart relates, for example, to the reading of the odd-numbered frames memory MT1. The lines are read in the memory MT1, in pairs, for 150 $\mu$s at intervals of 277 $\mu$s (line a).

The pairs of odd-numbered lines are transmitted to the memory MBL1 (line b) and the pairs of even-numbered lines are transmitted to the memory MBL2 (line c).

The pairs of lines thus written in these memories are read alternately in the two memories. They are given, with the two lines of each pair being separated into two channels for 150 $\mu$s, to two control voltage memories, MTC1 and MTC2 (line d).

This last read operation is performed at a speed that varies discretely and aperiodically during the lines such that the duration dt, during which the luminances 11 and 12 of the paired pixels on the two lines are available, is inversely proportionate to the rotation speed of the line galvanometer at the considered line scan instant t.

The functioning of the memories is controlled by a sequencer SEQ, FIG. 7, designed according to a standard technology. From a synchronizing circuit S, it receives a clock signal H, a frame parity signal PT and a frame suppression signal SUPT, and it also receives a window signal SF from the extractor.

The memories MT1 and MT2 are controlled by means of selectors S1 and S2 of address signals AE1 and AL1. These selectors are themselves controlled by the signal PT. The read and write operations are determined by the signals E/L and L/E. The writing is done in a standard way, while the reading is done at the rate of the laser image.

The memories MBL1 and MBL2 are controlled by selectors S3 and S4 of address signals AE2 and AL2. These selectors are themselves controlled by the control signal CA.

The read address signal AL2 comes from a circuit according to the invention, namely a aperiodic read generator GLA described further below.

A generator of scanning signals for galvanometers GBG is built according to a standard technique. It receives the clock signal H, the signal SUPT. It gives the saw-toothed scan signals BL and BT to galvanometers not shown in the figure. Furthermore, it gives the memories of the control voltages MTC1 and MTC2 the signal t which digitally represents the time elapsed during each line.

Figure 9:
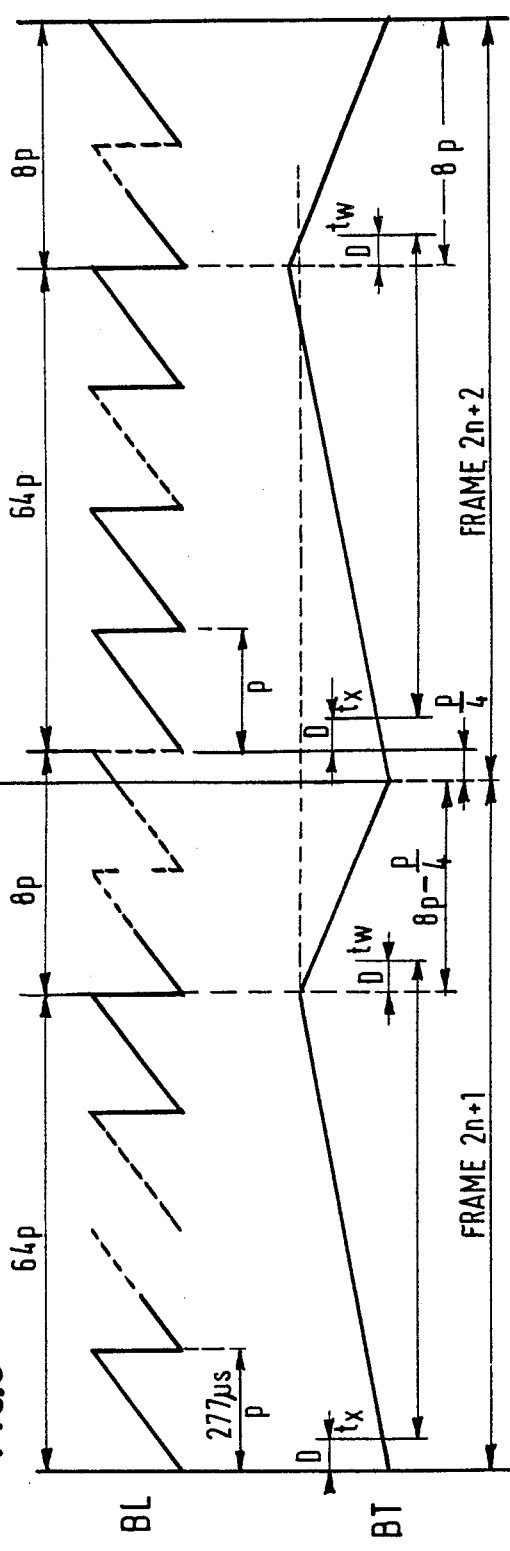

The graph of FIG. 9 shows the signals BL and BT. These two signals are not drawn to the same scale (in ordinates) on the figure. They are time-shifted with respect to the signal SUPT by a certain lag of 2.2 ms.

Furthermore, the movement of the galvanometer (FIG. 11) and the useful period of the 150 $\mu$s line are time-shifted by a value D with respect to the line scan.

The result of this is that the line output periods, between the periods tx and tw (FIG. 10), are lagged with respect to the signal PL by the same value D.

The signal BL (FIG. 9) comprises, for example, 64 line scan periods p (p=227 $\mu$us) and eight unused periods in the frame return.

In order to do a laser image scanning by pairs of interposed lines, the frame return of the frame 2n+1 is reduced by a quarter cycle.

The laser frames, defined by the window of the extractor, coming from the standard parent frames are shown in FIGS. 12a and 12b. The interposed scanning and the projected laser image are shown in FIG. 12c.

The geometry correction is obtained by appropriate reading of the two-line memories MBL1 and MBL2. The address signal AL which performs this operation is given by the aperiodic read generator GLA, the diagram of which is shown in FIG. 13.

The addresses are effectively given by an addresses counter CA, with a number of postions equal to the number of pixels in the line, namely 256.

This counter is incremented by read beeps from an incrementation beeps memory MTI read at the elementary periods rate te=68.7 ns of the clock signal H.

This read-only memory has as many boxes, namely 2213, as there are elementary periods in the 150 $\mu$s duration of a line.

All the boxes are divided into 256 groups, in a number equal to the number of pixels in the line. They are arranged, for their reading, in the order of the successive time intervals obtained by regularly dividing the duration of the line by the number of pixels.

Each group includes a number of boxes which is inversely proportional to the mean speed of the line galvanometer during the time interval of the same order. The first box in each group contains only one bit, the reading of which causes an incrementation beep of the address counter.

The successive read addresses of the memory MT1 are given by an elementary period counter PTE with as many positions as boxes in the memory. It is incremented by the clock signal H.

The geometry and structure of the GLA generator are corrected with the following data. The standardized speed curve V/Vmax=H(t) is shown in FIG. 4. It is put in the polynomial form, as a function of time t:

$$H(t) = A_0 + A_1 \times t + A_2 \times t^2 + A_3 \times t^3 + A^4$$

the coefficients of which are calculated by the least squares method using a standard type of computer.

The useful period of 150 $\mu$s is divided into as many time intervals as there are pixels in the line, namely 256 pixels. To each time interval, there is assigned a coefficient which is inversely proportionate to the speed and the form C=1/H(t) which, for each interval, becomes:

$$C_i = 1/H \left[ \frac{(t1 + t2)(1 + 2i)}{512} \right] - t1$$

with 0<i<255 and t1=t2=time included between b and e (FIG. 2)=150 μs in the example considered (FIG. 14).

The useful duration T1 of the line is measured in the number of elementary clock periods te chosen to be as small as possible.

If te is equal, for example, to 67.8 μs, the ratio N=T1/te=2213.

This number if equal to the number of boxes of the memory MT1 and the number $n_i$ of boxes in each group is given by the formula:

$$n_1 = N \times C_i / S$$

S being the sum of the coefficients $C_i$, with i varying from 0 to 255. The number of boxes thus varies between 18 and 20 at the ends of the line and 6 in the middle of the line.

For each pair of lines alternately leaving the memories MBL1 and MBL2, the control voltage memories MTC1 and MTC2 are simultaneously given, firstly, the digitized values 11 and 12 of the paired pixels on both lines and, secondly, the value of the period on the line transmitted by the signal t.

The various values 11 and 12 and t form a set of possible triple combinations which constitute the read addresses for the memories MTC1 and MTC2.

Each of these combinations or addresses is assigned a voltage digitized value, V1 in MTC1 and V2 in MTC2. The values V1 and V2 are converted in two digital-/analog converters C2 and C3 and the corresponding voltages are given respectively to the two channels of the modulation control circuits CM which themselves control the modulator MO. This modulator modulates the laser ray emitted by the laser L and gives the laser beam with two channels FL (containing F1 and F2).

The values V1 and V2 are determined by means of the above-mentioned relationships (i) and (j). The computation is done by computer. Tables of functions $C_i$, $C_2$, $G^{(-1)}$, $F^{(-1)}$, and $H(t)$ are drawn up from polynomial or other expressions obtained by the least squares method and by the curves representing these functions. The various variables are each defined by the number of levels desired.

The values V1 and V2 should take into account the already mentioned luminance correction, resulting from the geometry correction given by the two-line memories.

To compute the voltages V1 and V2, the sought values for the effective fluxes F1 and F2 are respectively equal to the products $F'1 \times H(t)$ and $F'2 \times H(t)$ of the theoretical fluxes $F'1$ and $F'2$ which are proportionate, depending on projection conditions, to the luminances 11 and 12, by the coefficient H(t) smaller than 1 and proportionate to the rotational speed of the line galvanometer. The values of V1 and V2 are therefore given by the relationship (i) and (j) for all pairs of values $F1=F'1 \times H(t)$ and $F2=F'2 \times H(t)$, namely for all triple combinations F1, F2, H(t) respectively corresponding to the combinations 11, 12 and t.

FIG. 15 illustrates, by a correspondence between the curves C2, hD−1), CA and $g^{(-1)}$, the computations performed by a standard type of computer using digital tables.

For the variable $V_1$, for example, computation is done as specified above, using: the table C2, the computation of $F2/C2 = F'2 \times H(t)/C2$, the table $h^{(-1)}$, the table C1, the computation of $F1/C1 = F'1 \times H(t)/C1$, and the table $g^{(-1)}$. All the computations are repeated for all the values of V1 and the value chosen is that which is equal to the value chosen at the beginning of the computation.

What is claimed is:

1. A digital system for the generation of control signals for laser modulation multi-channel circuits for scanned image projectors using oscillating mirrors mounted on galvanometers, said system including one or more laser sources and a plurality of laser modulation circuits controlled by video signals from an image to be projected; and a plurality of oscillating mirrors mounted on pencil-shaped galvanometers capable of deflecting a laser beam from said laser sources along two orthogonal axis so as to provide a scanned image wherein one of said galvanometers is a line galvanometer; said digital system producing a digitized video signal and further comprising:

at least one compensation circuit which modulates the duration of the pixels of said image and which modulates the position of said pixels in the period of a line of said digitized video image wherein said compensation circuit includes a means for modulation which is inversely proportional to the instantation which is inversely proportional tot he instantaneous speed of said galvanometer and said compensation means further includes an adjustment for adjusting the values of the laser fluxes in proportion to said instantaneous speed of said galvanometer:

whereby said compensation circuit provides for adjustment and correction of line galvanometer motion non-linearity.

2. The system according to claim 1 wherein said galvanometers further include at least one frame galvanometer and wherein said compensation circuits include, for each modulation channel, a frame memory read in real time at the rate of deflection of said frame galvanometer, a multiple-line buffer memory and a control voltage memory, wherein said buffer memory of each of said modulation channels is read under the control of an aperiodic read generator.

3. The system according to claim 2 wherein, in order to project pairs of successive lines, a plurality of control voltage memories are utilized to provide the values of the control voltages of the laser modulation determining the fluxes needed to project each pair of pixels of lines with respective luminances desired and wherein there is included a means for calculating before hand from the response characteristics of said modulators and from the rotational speed curve of said line galvanometer, values which provide desirable projected dimensions;

means for storing said values at addresses consisting of all possible triple combinations formed between the digitized values of the luminances of said pixels of said lines and the value of each period of time considered during a line scan.

4. The system according to claim 3 wherein successive values of said luminances of each frame of said image to be projected are placed, line by line, in said buffer memories in the form of two successive lines for each of said frames in an alternating manner and wherein each of said two successive lines thus formed are read alternatively, in real time, in each of said buffer memories at a speed which varies in a discrete manner such that the duration for which the luminances of paired pixels on both lines are available and are given as addresses to said control voltage memories wherein said addresses are inversely proportional to the rotational speed of said line galvanometer at any predetermined time in the line scan.

5. A system according to claim 4 wherein said read addresses of said buffer memory are given by an address counter, incremented by a signal received from the reading of a read-only memory which is read at an elementary clock period rate and which contains a plurality of boxes corresponding to the number of elementary periods in the duration of a line with all the boxes being divided into groups equal in number to the number of pixels in the line and ordered, for their reading, in the order to the successive time intervals obtained by regularly dividing the duration of the line by the number of said pixels, each group comprising a number of boxes which number is inversely proportional to the means speed of said line galvanometer during the time interval of the same order, wherein the first box of each group contains a single bit, said system further including a reading means for reading said single bit in order to cause an incrementation beep by said address counter.

* * * * *